Patented Apr. 3, 1951

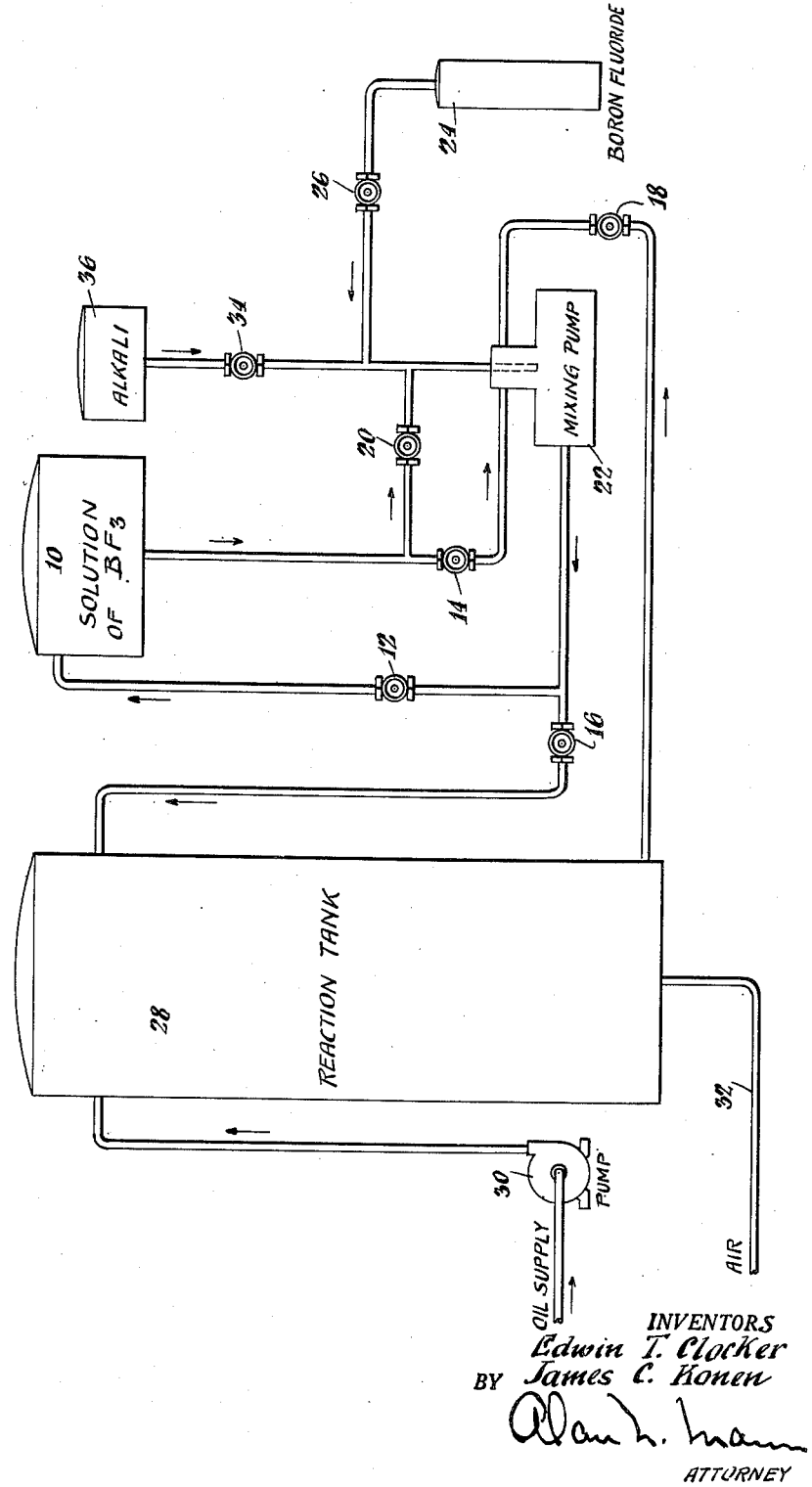

2,547,760

UNITED STATES PATENT OFFICE 2,547,760

POLYMERIZED FATTY OILS

James C. Konen and Edwin T. Clocker, Minneapolis, Minn., assignors to Archer-Daniels-Midland Company, a corporation of Delaware Application December 30, 1949, Serial No. 136,103

15 Claims. (Cl. 260—406)

This invention relates to a new type of drying or semi-drying oil having the characteristics which we believe were never obtained conjointly before our present invention and which we believe cannot be produced by any process other than the process herein described which is also part of our invention.

There are two common methods of thickening, i. e., increasing the viscosity of natural drying and semi-drying oils—heat polymerization and oxidation by blowing with air. Thermal polymerization is expensive because of the high temperatures and long heating required and because of losses due to decomposition of the oil. Thickening by blowing is economical since temperatures in the operation are low and no loss in weight is involved. Blown oils also have the advantage of quicker "set-up" to a continuous film than the corresponding raw oil. However, if oils are blown to appreciably high viscosities they lose to a great extent their ability to dissolve in mineral spirits and conversely the mineral spirits is not readily soluble in the highly blown oil. In addition, oils which have been blown under common conditions to an extremely high viscosity, e. g. greater than 150 poises, are not viscosity stable. They tend to gain body spontaneously on storage, and over a period of time will solidify and become useless.

It is the purpose of this invention to make a product which has many of the physical and useful characteristics of a blown oil, along with economy of manufacture, but which does not have the disadvantages of a blown oil with respect to poor viscosity stability, poor color or lack of mineral spirits tolerance at high intrinsic viscosities.

When in this application we refer to mineral spirits tolerance, we determine such tolerance in accordance with the method of Sorensen as described in the book entitled: "Physical Examination of Paints, Varnishes and Lacquers" edited by H. L. Gardner.

Blown oils may be heat-bodied to keep mineral spirits tolerance at high viscosities but such products are extremely dark in color and thus their usefulness is very limited. This bodying involves a release of gases and high losses result due to extreme decomposition of the oil.

Broadly speaking, the unusual features of our drying oil are found in its improved drying characteristics as compared with the same oil in the raw state and its high degree of mineral spirits tolerance taken together with a high viscosity and a high iodine value when compared with an ordinary blown oil made from the same base raw stock.

Our oil can be produced from any of the usual drying or semi-drying oils and a general specification of it can best be given in terms of a comparison with the natural oil employed treated by regular and well-known processes. Bearing this in mind, the preferred oil of our invention shows the following characteristics: It has an acid number between 3 and 7; it has a maximum color of 14 on the Gardner standard; its viscosity is at least Q, but preferably at least Y on the Gardner-Holdt scale measured on the basis of 70% solids in mineral spirits; its iodine number is higher than that of a sample of oil of the same basic chemical composition given a standard blowing treatment to bring it up to the same viscosity as the sample of our oil, and its mineral spirits tolerance is at least 200% of that of a sample of oil of the same basic chemical composition given a standard commercial blowing treatment to bring it up to the same viscosity as the sample of our oil measured in the manner indicated above. Actually in the case of soya bean oil we frequently have obtained infinite solubility in mineral spirits at viscosities of Y or above. Further, this oil on analysis will be found to contain traces of boron but less than 0.05% of that element. While the above characteristics define our new product, in some instances our process may be used advantageously to produce products having some but not all of the characteristics defined above.

For the purpose of making the analysis and comparisons set forth above, the analyst should by standard methods determine the natural source of the sample under examination, that is, should determine for example whether it is a treated linseed oil, soybean oil or fish oil or other similar type of oil. Methods of doing this are known in the art. He should then take a typical sample of oil of the same general nature (which for the purposes of this specification can be assumed to have the same basic chemical composition as the oil under analysis, before treatment) and submit it to a standard blowing process as is well understood in the art until its viscosity equals that of the sample under examination. The iodine number and mineral spirits tolerance of the sample being studied can then be compared with the sample made by blowing the natural product. As stated above, the iodine number of the sample under examination must be higher and its mineral spirit tolerance must be at least 200% of the comparative sample.

Certain of the above novel features of our invention may be illustrated by the following comparative runs:

(1) Raw linseed oil blown in a regular commercial operation to 13 poises was bodied to 31 poises with BF$_3$ using linseed oil as a solvent for the BF$_3$. The reaction was run at 180° F. as this was the regular blowing temperature used on the comparative blown oil. The reaction was stopped when a viscosity of 31 poises was reached, by an amount of sodium hydroxide equivalent to the BF$_3$ used. No volatile material was employed. A comparative sample of the same base oil was blown with air to a viscosity of 31 poises. These two samples showed the following characteristics:

|  | BF$_3$ Treated | Air Treated |
| --- | --- | --- |
| Acid Number | 5.79 | 6.07 |
| Iodine Number | 124.6 | 116.8 |
| Solubility in Mineral Spirits | 59.7 | 8.02 |

In another case raw linseed oil was blown in an iron kettle at 180° F. to about 90 poises and a sample of the product was taken. Another sample of the same base oil having an initial viscosity of 25 poises was bodied to about 90 poises by the same general procedure mentioned above using BF$_3$ as the bodying catalyst. These two samples showed the following characteristics:

|  | BF$_3$ Treated | Air Treated |
| --- | --- | --- |
| Acid Number | 6.38 | 6.18 |
| Iodine Number | 119.6 | 109.5 |
| Solubility in Mineral Spirits | 11.96 | 4.12 |

In a third case an attempt was made to continue the air blowing of the heavy bodied raw oil employed in the second example to such a viscosity that when cut with 15% mineral spirits the resulting diluted oil would have the same viscosity as a sample bodied with BF$_3$ to about 1500 poises (a commercial type of product). However, this procedure was found to be impracticable since an oil blown to such a high viscosity was virtually impossible to cut with mineral spirits and it was found that the oil went to a gel.

While these examples give comparative results on the laboratory basis, we give the following specifications for linseed oil and soya bean oil treated by our process to give commercial products. In these examples all characteristics are taken on samples containing 30% volatile solvent (mineral spirits).

We give the following as particular specifications of certain typical oils:

A typical specification for a linseed oil treated by our process is as follows:

Acid number, 3 to 7
Color, 14 max.
Viscosity, Y to Z-1 (measured as above)
Iodine number, 84 to 92
Saponification value, 152 to 159
Mineral spirit tolerance, 10 minimum
Boron, traces but less than .04%

A specification for a soybean oil treated by our process is as follows:

Acid number, 3 to 7
Color, 14 max.
Viscosity, Y to Z-1
Iodine number, 60 to 70
Saponification number, 154 to 160
Mineral spirit tolerance, 20 minimum
Boron, traces but less than .04%

While our process may under some circumstance be employed to obtain valuable results that are not within these specifications, these are the results that are obtained when the process is fully employed and it is the oily product covered by these specifications which we believe to be new and useful and which is one of the subjects of the present invention.

It is our belief that the oils having the characteristics stated above can only be obtained by forming a new type of molecule in which individual fatty acid chains are combined together through oxygen linkages instead of by direct carbon-to-carbon linkages which result from normal polymerization. At the present time we know of only one way in which this reaction can be carried out. This way comprises the steps of first blowing the oil to cause oxygen to combine at the double bonds of the fatty acid chains and then by carefully controlled but properly catalyzed polymerization causing the molecules to react so that they combine through the oxygen linkages. We have discovered that this can be done by employing very small quanities of boron fluoride as a catalyst. The amount of boron fluoride employed is critical. It should be within the range between .01% and 0.2% and under no circumstances should it exceed 0.3%. If the higher quantities of boron fluoride are employed, it will be found that the reaction is virtually uncontrollable.

As to temperature, the reaction may be conducted at room temperature (about 70° F.) but somewhat higher temperatures, say between 100° F. and 200° F. are preferable and we may operate as high as 250° F. In some cases it may be desirable to dilute the oil somewhat before treating it with boron fluoride. This is not critical and is done as a matter of convenience. Mineral spirits or other usual organic solvent for oils may be employed and ordinarily not more than about 15% of such solvent will be used during the reaction and further dilution to any desired standard may be done subsequently.

When these conditions are carried out, we get what we believe to be the oxygen linkages and get the product of the present invention. This is a totally different product from that obtained by the so-called dehydration treatment wherein oils are either blown or oils such as castor oil having oxygen in the molecule are employed. In those cases by the use of so-called dehydration catalysts the oxygen together with hydrogen from the molecule is driven off as water. Heretofore the dehydration reaction has been considered typical of a reaction obtained by heating blown oils with a catalyst, but this reaction is exactly the opposite of the reaction which we are trying to obtain. In one case the oxygen is driven off, while in our case it is essential that the oxygen remain in the molecule to serve as a linking agent for polymerization.

Where larger amounts of boron fluoride are employed without using blown oil as a base, polymerization is obtained but the oil is relatively inert and this gives the standard and ordinary carbon-to-carbon combination. This type of polymerization results in a marked reduction in iodine number. For example, it has been employed in the past for treating semi-drying oils to make lubricating oils which are substantially non-drying. In our case any reduction in the iodine number is relatively slight and ordinarily is less than the reduction which accompanies blowing the oil to get a comparable viscosity.

Since we are trying to obtain a molecular structure with oxygen cross-linkages the preliminary steps of blowing to introduce oxygen is necessary. The amount of blowing may vary substantially but in order to obtain our specification, the blowing must be conducted to such an extent that it has an increase in weight of at least 1%. Ordinarily it will be satisfactory if the oil is blown to a viscosity of 15 poises or more. At the top limit, we prefer to use an oil which has not been blown beyond the point of fluidity at normal temperatures.

In the specification of our product we have stated that the oils of our process have a mineral spirit tolerance equal to at least 200% of the tolerance of a sample of oil of the same basic chemical composition given a standard commercial type of blowing treatment to bring it up to the same viscosity as the sample of our oil. This is a minimum and the mineral spirit tolerance may be substantially greater. For example, in some instances we have found that oil treated by our process until it is a substantial gel may have a mineral spirit tolerance substantially greater than a sample of oil of the same basic chemical composition which has been given a standard commercial type of blowing treatment sufficient to bring it up to a viscosity of 100 poises.

Another characteristic of our oils is the stability of their viscosity. A conventional blown oil of a viscosity of about 106 poises if diluted with 15% of mineral spirits will go to a solid gel quite quickly on aging. With our process the oil which is blown and diluted with 15% of mineral spirits and then brought catalytically to the same viscosity of 106 poises will hold this viscosity substantially unchanged for an indefinite time.

We have stated that the amount of catalyst used is critical. If an undue amount of catalyst is employed, chars and gels are formed due to local action, and in large commercial batches it is necessary to take special precautions so that undue local concentrations will not occur.

We have found that this difficulty can be overcome by first absorbing the boron fluoride in a solvent which preferably can remain in the final product or is sufficiently volatile. Such solvent should be a material which is not substantially affected by the catalyst or is affected relatively slowly. After this solution is formed, portions of this solution are progressively mixed with portions of the oil under conditions which insure that the dispersion of the catalyst through the mass will take place quite rapidly. An excellent way of accomplishing this is to pass the oxidized oil through a pump and then to introduce the boron fluoride solution at a controlled rate into the oil in the chamber of the pump. Complete mixing results instantly and a uniform product is obtained which contains no gels or chars. For this purpose we prefer to use a centrifugal pump or gear type pump but any other type of pump providing sufficient turbulence may be employed.

One of the best ways of dissolving boron fluoride is to use an alkali-refined sample of the same oil as that which has been blown, as this will given an excellent color. The fact that heavy concentrations of the catalyst can be mixed with the unblown oil in this manner is strong evidence of the totally different type of reaction which takes place when boron fluoride is used with an ordinary oil and when it is used with the blown oil.

If preferred, instead of using a sample of the same oil or of some other fatty oil, we may use a volatile solvent for the boron fluoride which can be driven off by heat after the reaction is completed. As an example of a volatile solvent of this type, we may use the ethers.

The end point to which the reaction is to be carried is not critical and will depend upon the wishes of the operator. For many purposes the polymerization can be carried on all the way to gelation, whereas for paint manufacture it may be desired to stop the polymerization when the oil has a viscosity as low as Q when cut with sufficient mineral spirits to have present 70% non-volatile ingredients. This is equivalent to the viscosity of an undiluted oil having a viscosity of about 100 poises. Other intermediate viscosities may be obtained. When the oil has reached its desired viscosity the reaction can readily be stopped by the introduction of small amounts of a neutralizing agent such as any of the alkaline substances ordinarily used for refining oil. The alkali will decompose the boron fluoride and leave the boron in the mass in such form that its presence can be told by analysis.

The method of carrying out our invention can readily be understood by a description of the particular process in connection with diagrammatic showing of the apparatus which is illustrated in the accompanying drawing.

A mixture of 732 pounds of alkali refined linseed oil mixed with an equal weight of mineral spirits was introduced into the solution tank 10. The valves 12 and 14 were opened and the valves 16 and 18 were closed. The valve 20 was also closed. Mixing pump 22 was then started into operation and the oil from the solution tank 10 was circulated through the pump. Fifteen and one-quarter pounds of boron fluoride gas from the cylinder 24 was bled into the circulating oil in the course of 28 minutes, the gas flow being controlled by the valve 26.

When the proper weight of gas had been bled from the boron fluoride cylinder 24 and absorbed in the oil from solution tank 10, valve 26 was closed. The lines were pumped clear of solution and valves 14 and 12 were closed. The solution in tank 10 was then ready for mixing with the main body of oil to be treated.

This oil is pumped into the main reaction tank 28 by means of a pump 30. In this case, the tank 28 was charged with 13,000 pounds of an oil oxidized by blowing with air which was a commercial product known as HB raw linseed oil which was thinned with 1730 pounds of mineral spirits. This oil had been preheated to 140° F. to reduce its viscosity and thereby increase the pumping rate.

After the solution had been prepared in tank 10, valves 16 and 18 were opened and the oil from tank 28 circulated through the pump. The valve 20 was then opened and the boron fluoride solution from tank 10 was allowed to mix with the circulating oil in the body of the pump. The flow of this oil should be adjusted so that it is all added to the oil from tank 28 during one complete change in the total volume of oil in that tank. In this case the mixing operation was complete in 55 minutes. The lines were pumped clear of oil and the temperature of the tank 28 was adjusted to 150° F. The material in this tank was agitated gently by means of air injected through the bottom of the tank through the pipe 32.

At the end of 5¼ hours the viscosity had increased to 150 poises at which time it was desired to stop the reaction. To do this the material from the reaction tank was again circulated by mixing tank 22, with valves 12, 14, 20 and 26 closed. At the same time, valve 34 was opened to permit a measured amount of 30° Baumé caustic soda solution to enter the oil from tank 36. In this case 59 pounds of the solution were added over a period of 60 minutes and then the lines were again pumped clear. The temperature in tank 28 was maintained at 150° F. and gentle agitation was continued for another hour at the end of which time the process was considered finished and the final product was withdrawn. This final product had the following characteristics:

Viscosity, 106.8 poises
Acid number, 5.45
Solubility in mineral spirits, one part in 11.5 parts of mineral spirits This may be compared with a solubility of the starting oil of one part in 7.68 parts of mineral spirits. This product had a drying time of 2¼ hours using .2% lead and .025% of cobalt as drying agents. This may be compared with the original starting oil which had a drying time of 3 hours with the same driers.

In another example 1000 parts by weight of a blown alkali refined soybean oil were mixed with 150 parts by weight of mineral spirits and heated to 150° F. A mixture was formed by dissolving 0.525 part of boron fluoride in a mixture of 30 parts refined linseed oil and 30 parts mineral spirits and this solution was then mixed with the blown oil. The material was held at 150° F. for 3 hours and then the catalyst was destroyed, as before, with a solution of sodium hydroxide. The final material dried in three hours using lead and cobalt driers. The original, untreated oil dried in about 16 hours using the same amounts of drier.

In the foregoing examples the boron fluoride is blended with an unoxidized oil as an intermediate vehicle. In place of such an oil one may use other solvents such as N-butyl alcohol, isobutyl alcohol, propyl alcohol, hexanol, phenols, acetic acid, oleic acid, propionic acid, ethyl ether and butyl ether. The actual solvent selected will depend in some part upon the ultimate use to which the product is to be put.

This application is a continuation in part of our earlier abandoned application, Serial No. 585,964.

What we claim is:

1. The process of treating an unsaturated fatty oil which comprises blowing the unsaturated fatty oil to add oxygen to the molecules of the oil, forming a mixture of the blown oil with boron fluoride as polymerization catalyst in the proportion of at least 0.01 part for 100 parts by weight of the oil, and maintaining the mixture at a temperature between room temperature and 250° F. until the viscosity of the oil is equivalent to the viscosity of an undiluted oil having a viscosity in excess of 100 poises, the oil so produced having a greater tolerance for mineral spirits than the unsaturated oil thickened by blowing alone to the same viscosity.

2. A process as specified in claim 1 in which the oil is blown until its weight is increased at least 1% but not beyond the point of fluidity at normal temperatures.

3. A process as specified in claim 1 in which the amount of boron fluoride is between 0.01 and 0.3 part for 100 parts by weight of the oil.

4. A process as specified in claim 1 in which the temperature at which the said mixture is maintained is between 125° F. and 175° F. and the proportion of the boron fluoride is between 0.01 and 0.2 part for 100 parts of the oil.

5. A process as specified in claim 1 in which the reaction is stopped after the desired increase in viscosity has occurred by introducing alkali in an amount at least chemically equivalent to the boron fluoride present to destroy the catalyst.

6. An improved drying oil consisting of an oxidized unsaturated oil treated with boron fluoride as described in claim 1 and showing traces of boron, but less than 0.04%.

7. An improved drying oil as described in claim 6, the oil being a plastic mass at ordinary temperatures.

8. An oily mass having a viscosity of at least 100 poises and a tolerance for mineral spirits not less than approximately 11.5 parts to 1 of the oily mass, the said mass being the product of the treatment of an oxidized unsaturated fatty oil with boron fluoride as described in claim 1, said mass showing traces of boron but less than 0.04%.

9. An oil resulting from blowing of an unsaturated oil to increase its weight at least 1% and treating it with between 0.01 part and 0.3 part of boron fluoride for 100 parts by weight of oil at a temperature between room temperature and 250° F., such oil having the following characteristics: acid number 3 to 7, color not over 14 on the Gardner standard, viscosity at least Q on the Gardner-Holdt scale measured on the basis of 70% solids in mineral spirits, having an iodine number higher than that of a sample of oil of the same basic chemical composition given a standard blowing treatment to bring it up to the same viscosity as the sample of the finished oil specified, having a mineral spirits tolerance equal to at least 200% of that of such a sample of oil of the same basic chemical composition given a standard blowing treatment to bring it up to the viscosity of the finished oil specified and showing traces of boron but less than 0.05%.

10. An oil as specified in claim 9 resulting from the blowing and treating of linseed oil, such treated oil having a viscosity ranging from Y to $Z_1$ on the Gardner-Holdt scale measured on the basis of 70% solids in mineral spirits, having an iodine number between 84 and 92 and a mineral spirits tolerance of at least 10 determined as specified herein and showing traces of boron but less than 0.04%.

11. An oil as specified in claim 9 resulting from the blowing and treating of soybean oil, such treated oil having a viscosity ranging from Y to $Z_1$ on the Gardner-Holdt scale measured on the basis of 70% solids in mineral spirits, having an iodine number between 60 and 70 and a mineral spirits tolerance of at least 20 determined as specified herein and showing traces of boron but less than 0.04%.

12. A process of treating an oxidized fatty oil with boron fluoride which comprises dissolving boron fluoride in substantially unoxidized oil soluble in the oil to be treated in the proportion of between 0.01 part and 0.3 part of the boron fluoride as catalyst to 100 parts of the oil to be treated, then progressively mixing portions of the oil to be treated with portions of the solution whereby undue local reactions are prevented and maintaining the resulting mixture at a temperature between room temperature and 250° F. until the viscosity of the said product is equivalent to the viscosity of an undiluted oil having a viscosity in excess of 100 poises and until such product comes to have a greater tolerance for mineral spirits than a sample of similar oil oxidized to a viscosity equivalent to the viscosity of an undiluted oil having a viscosity of at least 100 poises.

13. A process as specified in claim 12 in which the oil to be treated is diluted with mineral spirits to show about 70% non-volatile ingredients and is brought to a viscosity of at least Q on the Gardner-Holdt scale.

14. A process as specified in claim 12 in which oil to be treated is withdrawn progressively from a larger mass of such oil and after being mixed with a portion of the solution of boron fluoride is promptly returned to such larger mass and such mixing is continued until all the solution of boron fluoride is blended in.

15. A process as specified in claim 12 in which the oil to be treated has been diluted with a thinning solvent.

JAMES C. KONEN.
EDWIN T. CLOCKER.

No references cited.